United States Patent [19]
Williams et al.

[11] Patent Number: 5,516,145
[45] Date of Patent: May 14, 1996

[54] INSTRUMENT PANEL ASSEMBLY

[75] Inventors: Stephen L. Williams, Novi; Adelbert T. Czapp, Huntington Woods; Timothy J. Quinlan, Trenton; Paul G. Maertens, Highland, all of Mich.

[73] Assignee: Chrysler Corporation, Auburn Hills, Mich.

[21] Appl. No.: 493,227

[22] Filed: Jun. 20, 1995

[51] Int. Cl.⁶ .................................................. B60R 21/16
[52] U.S. Cl. ........................................ 280/732; 280/728.2
[58] Field of Search .......................... 280/728.1, 728.2, 280/732, 752; 180/90; 246/70

[56] References Cited

U.S. PATENT DOCUMENTS

| | | | |
|---|---|---|---|
| 5,183,288 | 2/1993 | Inada et al. | 280/732 |
| 5,230,530 | 2/1993 | Iriyama et al. | 280/732 |
| 5,273,310 | 12/1993 | Terai | 280/732 |
| 5,403,033 | 4/1995 | Koma | 280/728.2 |
| 5,445,410 | 8/1995 | Czapp et al. | 280/728.3 |

FOREIGN PATENT DOCUMENTS 4303051  10/1992  Japan .................................. 280/728.2

*Primary Examiner*—Christopher P. Ellis
*Attorney, Agent, or Firm*—Edward A. Craig

[57] ABSTRACT

An instrument panel assembly is provided having a passenger air bag canister mounted on a metal frame in front of a hinged door of an instrument panel. The door is pushed open by the inflating air bag when the air bag deploys in a collision. The metal frame has mounting brackets on opposite sides of the door opening. The canister is secured to a rear frame bar extending between the brackets. The bar is removably attached to the brackets so that if damaged when the air bag deploys, it may be removed and replaced obviating the need to replace the entire metal frame. A front canister-mounting frame bar, forwardly of the rear frame bar, normally is not damaged upon deployment of the air bag.

1 Claim, 3 Drawing Sheets

5,516,145

1

INSTRUMENT PANEL ASSEMBLY

FIELD OF THE INVENTION

This invention relates generally to instrument panel assemblies for automotive vehicles and more particularly to an instrument panel assembly in which the passenger air bag canister is mounted on a metal frame concealed by a door in the instrument panel.

BACKGROUND AND SUMMARY

In accordance with the present invention, it is not necessary to replace the entire instrument panel assembly following deployment of the passenger side air bag. Preferably, the air bag canister is attached to a metal frame in front of a door-controlled opening in the instrument panel. The metal frame preferably has a pair of brackets mounted on the instrument panel at opposite sides of the opening. The passenger air bag canister is attached to a generally horizontal bar or bars extending across the opening and secured to the brackets. Preferably, front and rear mounting bars are employed. When the passenger air bag deploys, it causes the canister to bellmouth. In order not to interfere with bellmouthing of the air bag, the rear frame bar is so made that it will yield and bend. The capability of the rear frame bar to bend or deform also acts as a cushion to absorb energy should the knees of a passenger be pushed forward in a frontal collision. The rear frame bar is removably mounted on the brackets so that when bent or damaged it can be readily removed and replaced without the necessity of replacing the entire metal frame. Thus, the system may be completely repairable by merely replacing the air bag and canister, the rear frame bar, and sometimes the top pad assembly of the instrument panel.

One object of this invention is to provide an instrument panel and air bag assembly having the foregoing features and capabilities.

Another object is to provide an instrument panel and air bag assembly which is composed of a relatively few simple parts, is rugged and durable in use, is easily repairable, and is capable of being inexpensively manufactured and installed.

These and other objects, features and advantages of the invention will become more apparent as the following description proceeds, especially when considered with the accompanying drawings.

2

Figure 4:
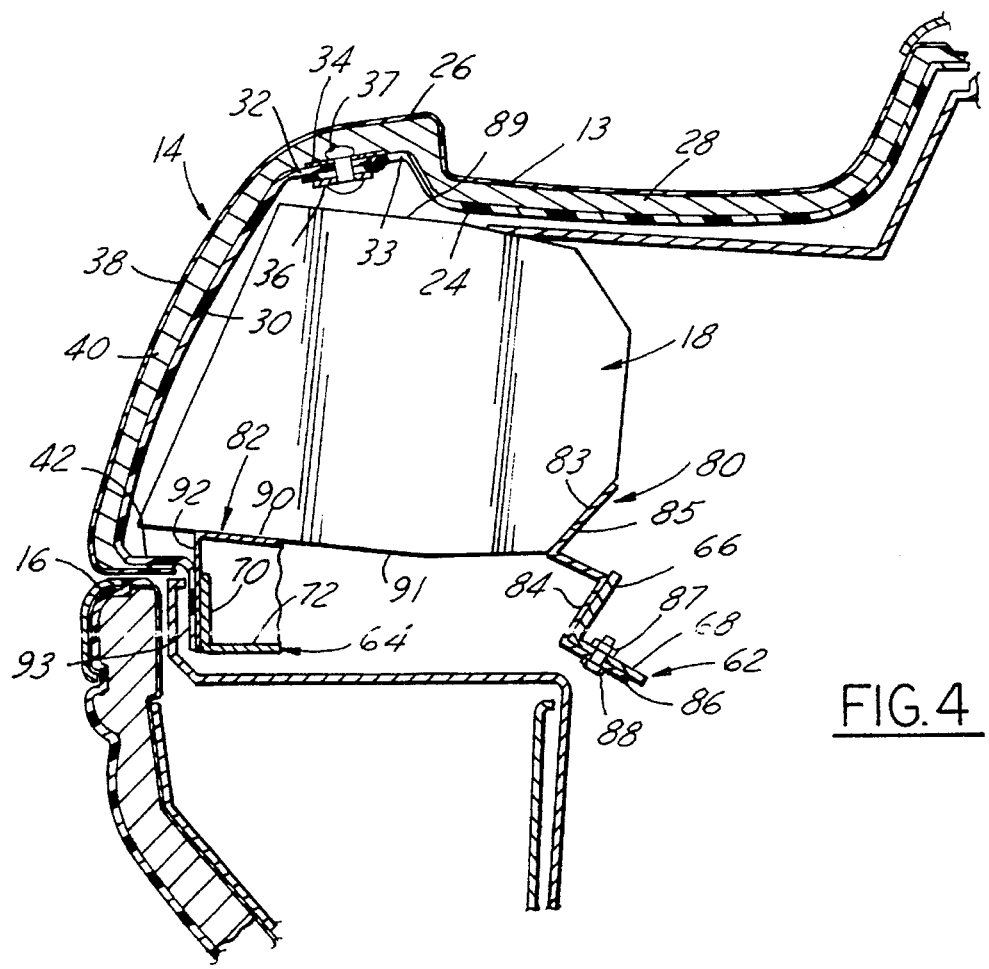
FIG. 4 is a sectional view taken on the line 4—4 in FIG. 1, prior to deployment of the air bag.
Figure 5:
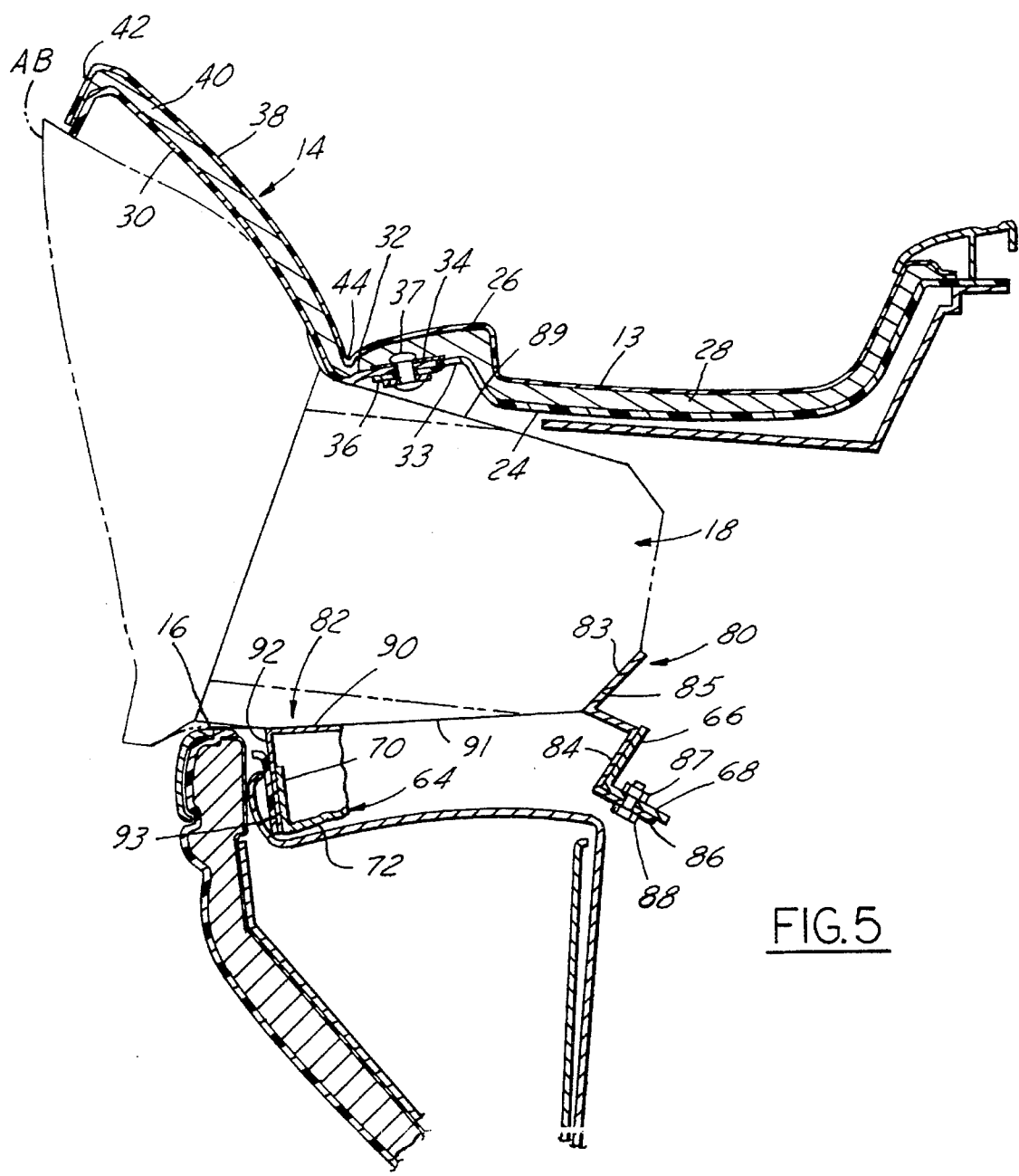

FIG. 5 is a sectional view similar to FIG. 4, but showing the position of the parts after deployment of the air bag. The canister bellmouths after air bag deployment as shown in solid lines. Broken lines show the canister prior to deployment.

DETAILED DESCRIPTION OF THE PREFERRED EMBODIMENT

Referring now more particularly to the drawings, the instrument panel assembly 10 of this invention comprises an elongated instrument panel 12 having a wall 13 provided with a door 14 for closing an opening 16 in the instrumental panel. The door conceals a canister 18 for a passenger air bag mounted in front of the opening. In a collision of sufficient severity, the air bag inflates and forces the door open and deploys through the opening.

The instrument panel 12 comprises a substrate layer 24 of a relatively stiff, self-supporting, somewhat flexible thermoplastic material such, for example, as a mixture of acrylonitrile-butadiene-styrene (ABS) and polycarbonate, molded to the desired configuration. A decorative layer 26 of very flexible vinyl or the like covers the substrate 24. A layer of foam padding 28 is sandwiched between the substrate layer 24 and the decorative layer 26. The foam padding may be made of an isocyanate, for example.

The door 14 comprises a generally rectangular substrate layer 30 of a flexible thermoplastic material, which preferably is a rubber-like elastomer such as a polyolefin, and usually somewhat more flexible than the substrate layer 24 of the instrument panel. The top portion 32 of the substrate layer 30 overlaps the portion 33 of the substrate layer 24 at the top of the opening 16 in the instrument panel and is secured thereto by elongated clamp bars 34 and 36. Rivets 37 extend through clamp bars 34 and 36 and through the overlapping material of the two substrates.

The decorative vinyl layer 26 for the instrument panel has an integral extension 38 which is substantially coextensive with and overlies the substrate 30 of the door. The padding 28 of the instrument panel also has an integral extension 40 which is sandwiched between the substrate 30 of the door and the vinyl extension 38. The door consists of the substrate 30 and the vinyl and padding extensions 38 and 40 and is turned forwardly at the bottom as seen at 42 in FIG. 4. The door has an integral horizontal hinge 44 by means of which the door can swing open to the position of FIG. 5.

The instrument panel 12 has apertures 46 and 48 on opposite sides of the door 14. The opposite side edges of the door define the laterally inner margins of the apertures 46 and 48. Air outlet distributors 51 and 52, preferably made of a relatively hard and rigid metal or plastic, are mounted in the respective apertures. The distributors have laterally spaced louvers 53 for directing the outflow of air.

The air bag canister 18 is mounted on a metal frame 56 secured to the front surface of the instrument panel in a position directly forward of the opening 16 in the instrument panel. The metal frame includes a pair of metal brackets 58 and 60, one on each side of the opening 16. The brackets are disposed in laterally spaced, generally vertical planes and are secured to the instrument panel by any suitable means preferably in a rigid and permanent manner.

The frame 56 has an elongated, laterally extending horizontal, metal front frame bar 62 extending between the brackets across the opening 16. The frame 56 also has an elongated, laterally extending, horizontal, metal rear frame bar 64 spaced rearwardly of the front frame bar and also extending between the brackets across the opening. Both frame bars are generally L-shaped in cross-section. The front frame bar 62 is composed of two flanges 66 and 68 arranged perpendicular to one another. The rear frame bar 64 is composed of two flanges 70 and 72 perpendicular to each other.

At each end of the front frame bar 62, the two flanges 66 and 68 have mounting tabs 74 extending perpendicular thereto. The mounting tabs 74 are secured by any suitable means, as, for example, by welding, to the respective brackets. The front frame bar 62 is usually not damaged by deployment of the air bag and hence the least expensive, quickest and most expedient means of attachment, in this case, welding, is usually employed to attach the front frame bar to the brackets.

At each end of the rear frame bar 64, the two flanges 70 and 72 have mounting tabs 76 extending perpendicular thereto. The tabs 76 are removably attached to the respective brackets preferably by threaded nuts 77 and bolts 78. The nuts and bolts 77, 78 are easily removed to detach the rear frame bar 64 in the event that it is damaged as a result of deployment of the air bag.

An elongated, horizontal metal lower frame bar 79 has tabs 81 at the ends which are welded to the brackets 58 and 60.

The canister 18 is secured to the front and rear frame bars 62 and 64 preferably by means including the mounting brackets 80 and 82. The mounting bracket 80 for the front frame bar 62 is shown as being generally W-shaped having one outer flange 83 disposed in flush surface-to-surface relation to the inclined front wall 85 of the canister and the flanges 84 and 86 thereof overlying the flanges 66 and 68 of the front frame bar 62 disposed in flush surface-to-surface relation therewith. The top wall of the canister 18 is shown at 89 and the bottom wall at 91.

Since after deployment of the air bag, the canister 18 is damaged and must be replaced, but the front frame bar 62 often is not damaged and hence does not have to be replaced, there should be a removable connection between the canister and the front frame bar. For that reason, the flange 86 of the mounting bracket 80 may be removably secured to the flange 68 of the front frame bar 62 by threaded nuts 87 and bolts 88. The flange 83 of the bracket 80 may be removably secured to the canister 18 by threaded nut and bolt assemblies or, since bracket 80 may be damaged by air bag deployment, it may be simply welded to the canister.

The mounting bracket 82 for securing the canister 18 to the rear frame bars 64 is L-shaped, having one flange 90 thereof disposed in surface-to-surface relation with the bottom wall 91 of the canister adjacent the rear of the canister and the other flange 92 disposed in flush surface-to-surface relation with the flange 70 of the rear frame bar 64. Since after deployment of the air bag, the canister 18 is damaged and must be replaced, and the rear frame bar 64 is usually bent and damaged and has to be replaced, the flange 90 may be secured to the canister 18 either permanently, as by welding, or removably by threaded nut and bolt assemblies and the flange 92 may be secured to the flange 70 of the rear frame bar 64 either permanently as by welding, or removably by threaded nut and bolt assemblies.

As noted above, the rear frame bar 64 is so made that it will bend under the force of the bellmouthing canister when the air bag deploys, so that it will not interfere with the proper deployment of the air bag. If the rear frame bar 64 were made too strong, it would add too much weight to the assembly and prevent the canister from bellmouthing. Also, if too strong, the rear frame bar 64 would not provide an adequate knee cushion when the passenger is thrown forward in a frontal collision.

The door substrate 30 may have an extended flap 93 secured to the flange 92 of the rear frame bar 64, which will tear away as shown in FIG. 5 when the door swings open.

Figure 1:
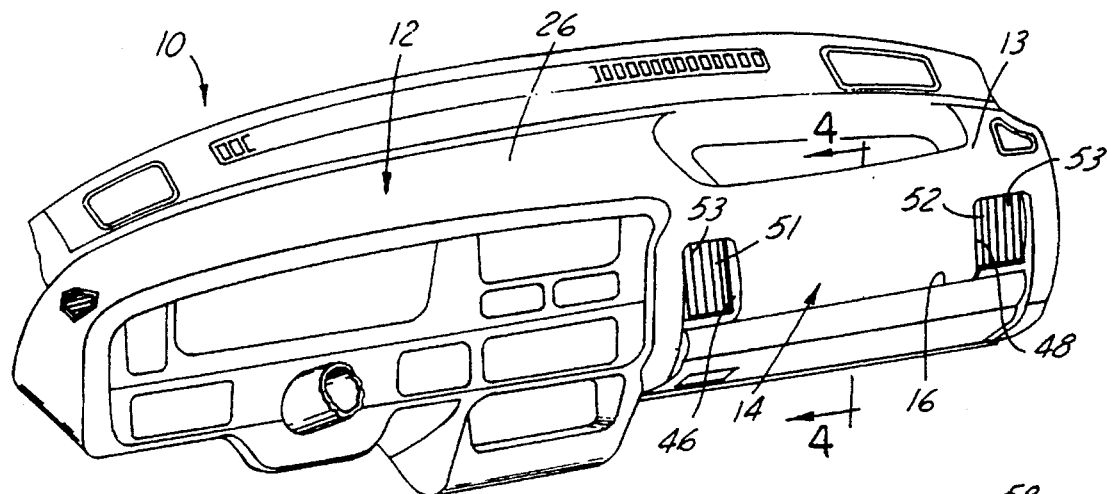
FIG. 1 is a perspective view of an instrument panel assembly constructed in accordance with the invention.
Figure 2A:
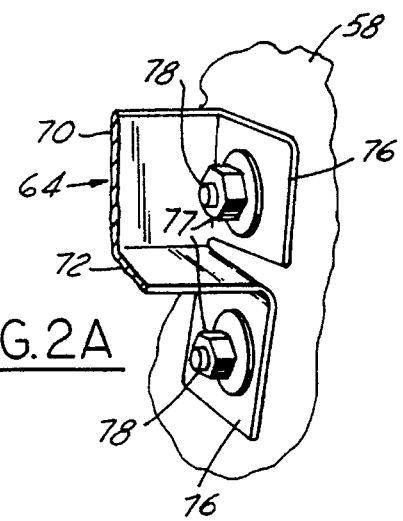
FIG. 2A is an enlarged fragmentary view in perspective of a portion of FIG. 2, looking in the direction of the arrow 2A in FIG. 2.
Figure 2:
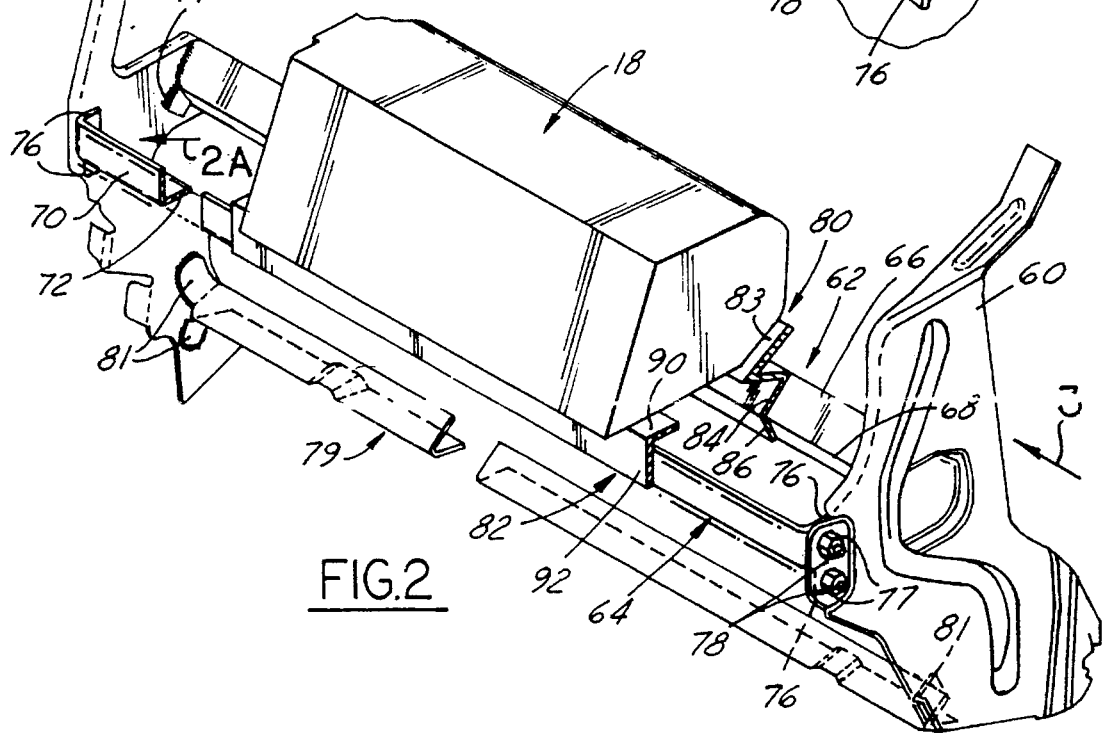
FIG. 2 is a perspective view showing the air bag canister and metal frame on which it is mounted as seen from the rear, and with the instrument panel removed. The wavy broken lines show the bent position the rear frame bar might assume after deployment of the air bag.
Figure 3:
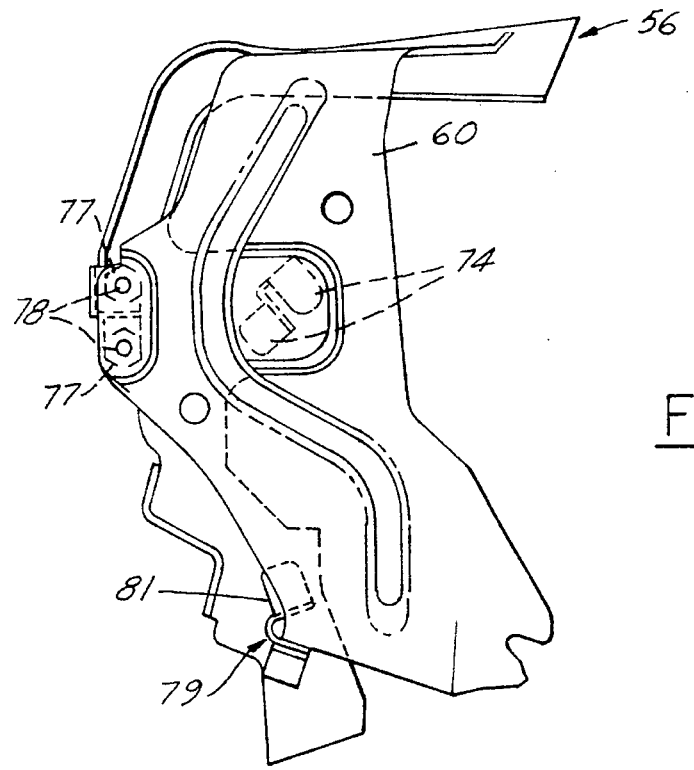
FIG. 3 is a side elevational view taken in the direction of the arrow 3 in FIG. 2.

In use, the canister 18 is mounted on the front and rear frame bars 62 and 64 of the metal frame 56 and the frame bars attached as described and illustrated to the brackets 58 and 60 of the metal frames. Upon deployment of the air bag, as in a collision of sufficient severity to trigger deployment of the air bag, the air bag will thrust rearward, forcing the door 14 to open and at the same time causing the canister to bellmouth. FIG. 5 shows the top and bottom walls of the canister after air bag deployment in solid lines and before deployment in broken lines. As shown in FIG. 5, and in broken lines in FIG. 2, the rear frame bar 64 becomes distorted or damaged by the bellmouthing of the canister. Because of the detachable mounting of the rear frame bar 64 to brackets 58 and 60, the rear frame bar may be readily removed and replaced without the need for replacing the entire metal frame 56. The air bag and air bag canister will also, of course, have to be replaced and sometimes at least portions of the instrument panel proper may have to be replaced. However, the front frame bar 62 and brackets 58 and 60 usually are not damaged and hence do not have to be replaced. The cost of repair and replacement is considerably lessened by the construction of this invention.

We claim:

1. An instrument panel assembly for an automotive vehicle comprising:

an instrument panel having a wall provided with an opening, a door normally closing said opening, a metal frame positioned forwardly of said instrument panel, said frame including laterally spaced brackets, means attaching said brackets to said instrument panel on opposite sides of said opening, said frame having an elongated, laterally extending, generally horizontal, metal front frame bar having opposite ends and extending between said brackets across said opening, said frame having an elongated, laterally extending, generally horizontal, metal rear frame bar having opposite ends and extending between said brackets across said opening rearwardly of said front frame bar, a passenger air bag canister in registration with said opening for storing an air bag, means removably attaching the front and rear of said canister to said front and rear frame bars, respectively, said door being hinged to said wall for pivotal movement to all open position in response to the force of the air bag thereagainst when the air bag inflates in a crash causing the canister to bellmouth and the inflating air bag to deploy through the opening, means attaching said ends of said front frame bar to said respective brackets, said rear frame bar having a pair of angularly related flanges providing said rear frame bar with an L-shaped cross-section, each said flange at each end of said rear frame bar having a mounting tab extending perpendicular thereto, a readily detachable threaded nut and bolt assembly removably securing each said tab to one of said brackets, enabling ready replacement of said rear frame bar in the event of damage thereto incident to deployment of the air bag, said rear frame bar being made so as to be capable of bending and not interfere with the bellmouthing of the canister and positioned to provide a yieldable knee cushion for absorbing energy when a passenger is thrown forward in a frontal collision, and the means removably attaching the front of said canister to the front frame bar including readily detachable threaded nut and bolt assemblies, enabling ready replacement of the canister after deployment of the air bag.

* * * * *